US007437362B1

(12) United States Patent
Ben-Natan

(10) Patent No.: US 7,437,362 B1
(45) Date of Patent: Oct. 14, 2008

(54) SYSTEM AND METHODS FOR NONINTRUSIVE DATABASE SECURITY

(75) Inventor: Ron Ben-Natan, Lexington, MA (US)

(73) Assignee: Guardium, Inc., Waltham, MA (US)

( * ) Notice: Subject to any disclaimer, the term of this patent is extended or adjusted under 35 U.S.C. 154(b) by 337 days.

(21) Appl. No.: 10/723,521

(22) Filed: Nov. 26, 2003

(51) Int. Cl.
*G06F 7/00* (2006.01)
*G06F 17/30* (2006.01)

(52) U.S. Cl. ............................ 707/9; 707/3; 707/6

(58) Field of Classification Search .............. 707/2, 707/9; 709/223
See application file for complete search history.

(56) References Cited

U.S. PATENT DOCUMENTS

| 4,451,916 | A | 5/1984 | Casper et al. ............. 370/16 |
|---|---|---|---|
| 6,085,191 | A * | 7/2000 | Fisher et al. ............. 707/9 |
| 6,205,475 | B1 | 3/2001 | Pitts ............. 709/218 |
| 6,332,163 | B1 | 12/2001 | Bowman-Amuah ......... 709/231 |
| 6,366,952 | B2 | 4/2002 | Pitts ............. 709/217 |
| 6,505,241 | B2 | 1/2003 | Pitts ............. 709/218 |
| 6,529,948 | B1 | 3/2003 | Bowman-Amuah ......... 709/217 |
| 6,539,396 | B1 | 3/2003 | Bowman-Amuah ..... 707/103 R |
| 6,550,057 | B1 | 4/2003 | Bowman-Amuah ......... 717/126 |
| 6,578,068 | B1 | 6/2003 | Bowman-Amuah ......... 709/203 |
| 6,581,052 | B1 * | 6/2003 | Slutz ............. 707/2 |
| 6,601,192 | B1 | 7/2003 | Bowman-Amuah ......... 714/38 |
| 6,606,660 | B1 | 8/2003 | Bowman-Amuah ......... 709/227 |
| 6,615,253 | B1 | 9/2003 | Bowman-Amuah ......... 709/219 |
| 6,636,585 | B2 | 10/2003 | Salzberg et al. ............. 379/22 |
| 6,678,355 | B2 | 1/2004 | Eringis et al. ............. 379/22 |
| 6,820,082 | B1 * | 11/2004 | Cook et al. ............. 707/9 |
| 7,043,541 | B1 * | 5/2006 | Bechtolsheim et al. ...... 709/223 |
| 2002/0078384 | A1 * | 6/2002 | Hippelainen ............. 713/201 |

* cited by examiner

*Primary Examiner*—Etienne P LeRoux
*Assistant Examiner*—Paul Kim
(74) *Attorney, Agent, or Firm*—Chapin IP Law, LLC

(57) ABSTRACT

Typical conventional database security scheme mechanisms are integrated in either the application or database. Maintenance of the security scheme, therefore, such as changes and modifications, impose changes to the application and/or database. Configurations of the invention employ a security filter for intercepting database streams, such as data access transactions, between an application and the a data repository, such as a relational database. A security filter deployed between the application and database inspects the stream of transactions between the application and the database. The security filter, by nonintrusively interrogating the transactions, provides a content-aware capability for seamlessly and nondestructively enforcing data level security. A security policy, codifying security requirements for the users and table of the database, employs rules concerning restricted data items. The filter intercepts transactions and determines if the transaction triggers rules of the security policy. If the transactions contain restricted data items, the security filter modifies the transaction to eliminate the restricted data items.

42 Claims, 12 Drawing Sheets

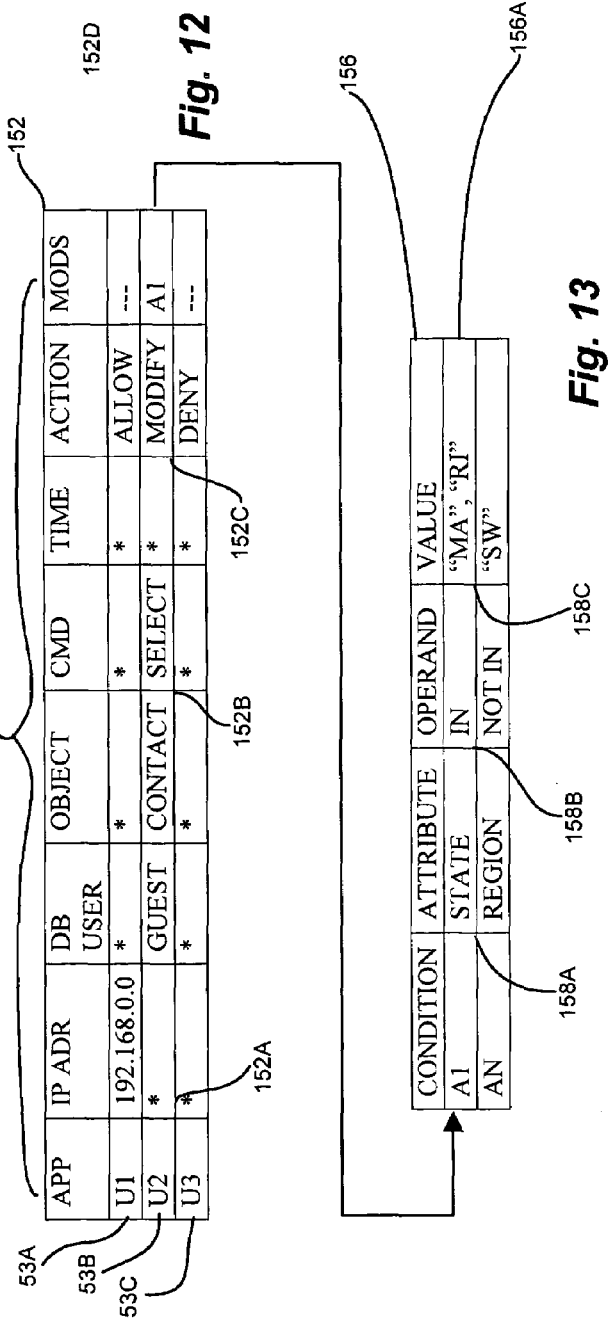

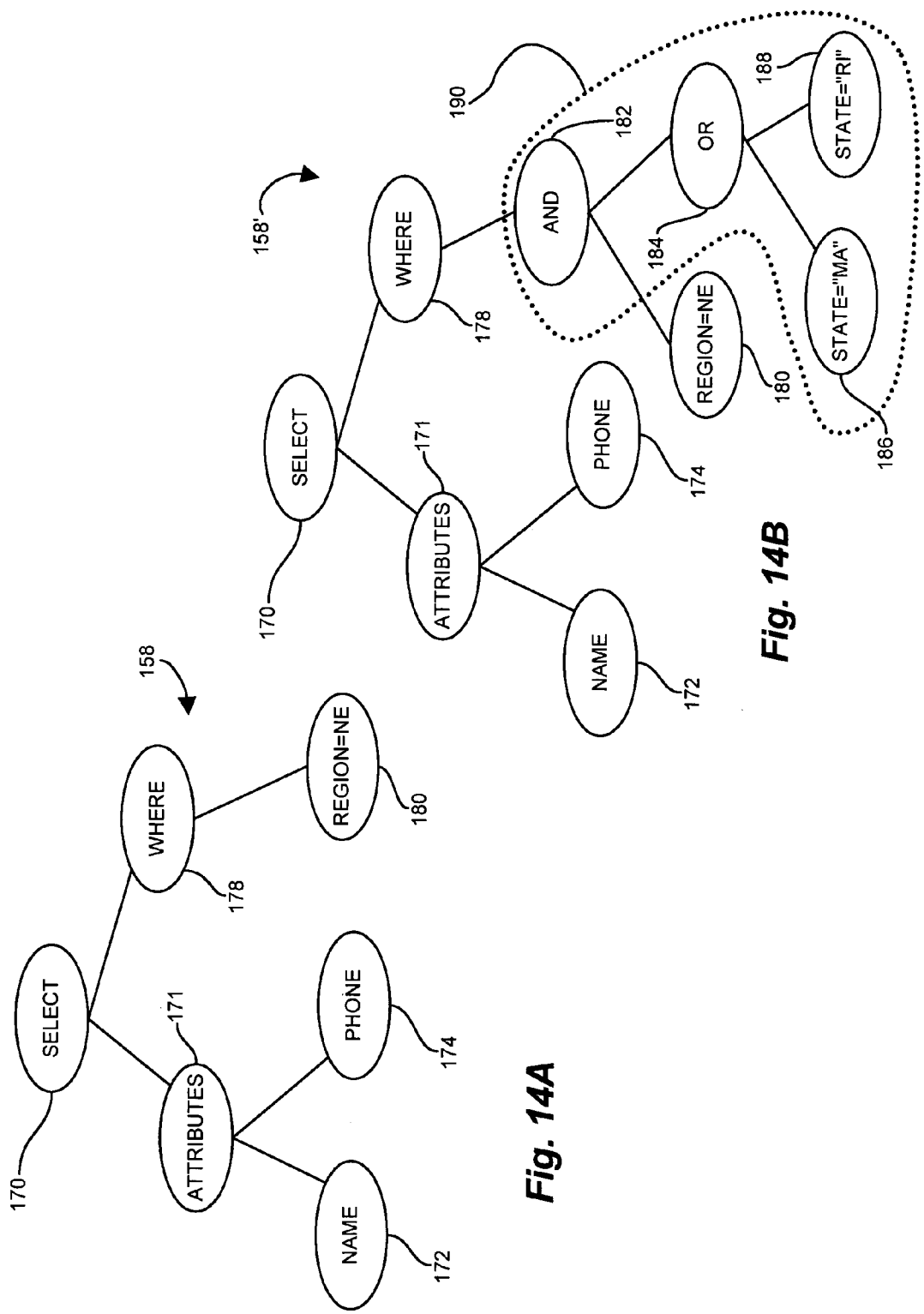

SYSTEM AND METHODS FOR NONINTRUSIVE DATABASE SECURITY

BACKGROUND OF THE INVENTION

Conventional applications in a data storage and retrieval environment typically operate with a data repository, such as a database, via a set of connections, or logical access streams, from the applications running in a user space into the database. A user application employs a stream from among the available connections to perform data storage and retrieval operations. The connections, therefore, provide a mechanism for multiple users to access the conventional database via a suite of user applications or clients which the database supports.

In a conventional data storage and retrieval environment, a conventional user application accesses the data repository for various data storage and retrieval operations. Such conventional data manipulation operations typically occur via a database management application accessible to the user application via an Application Programming Interface (API) or other conventional access method. Often, in such a conventional data storage and retrieval environment, many users share access to the data objects, typically relational database tables, in the conventional data repository. Usually, it is neither necessary nor desirable for every conventional user to have unlimited access to every data object, or table, in the data repository. Accordingly, conventional database driven storage and retrieval environments attempt limit or restrict access to certain data objects to a particular user or users.

Conventional database security techniques operate by associating database users with accessible data items. Accesses to the database cause the database server application to invoke a check of the associations with the purported access, to determine if the user is allowed to access the requested data items. The database manager or other security mechanism implementing the security techniques either allow or deny access accordingly.

SUMMARY

Often, however, such conventional database access control techniques may lack granularity, such as defining users in terms of groups and defining the database according to global portions, such as groups of tables, for example. It may become problematic to distinguish individual users and individual tables or sets in terms of a desirable or optimal security framework. Further, modifications to the conventional database security scheme, such as for accommodating new users, applications, or access privileges, typically involve changes to either the conventional user or client application or database server application, or both.

In a conventional data storage and retrieval environment, a security mechanism typically takes the form of either an access control list (ACL) or a data level (DL) security mechanism. The former strives to define pieces through which a user access the functionality for retrieving the data, and therefore designates which components of an application a user may employ. The latter approach, on the contrary, defines which data is visible to a particular user at the database, regardless of where the request emanates. The DL approach, therefore, allows a particular user to only "see" portions of the database permissible for access by the user.

The conventional access control list allows manipulation of database security with reference to the access control list via the application. Changes to the security scheme mandate changes to the application. Conversely, the conventional data level security mechanism implements security scheme changes via the database. The database, or more specifically, the database management system (DBMS) or server responsible for coordinating such access, enables a particular user to access certain database portions, typically tables, fields or rows. Changes to the security scheme involve modifications to the access rights to database tables, thus requiring changes to the database. Further, conventional DBMSs typically employ a database login corresponding to an application, not to a user invoking the application. Therefore, the user does not directly login to the database. In typical conventional applications, many users invoke the same application, and accordingly, pursue the same application level login to the database. Granularity of control is therefore difficult to modify in conventional database security approaches.

Therefore, such conventional approaches to database security involve changes to either the client application or to the database server in order to effect security scheme changes. Embodiments of the invention, therefore, provide a system and method to implement data level security between the application and the database. Such data level security of the invention implements a security policy independently of the application and the database, and therefore relieves the developer and implementer from modifying either the application or the database to reflect the security mechanism. Embodiments of the invention scrutinize and modify database communications, such as a transaction stream, between the application and the database to remove references or add constraints on access to sensitive or restricted data items.

Embodiments of the invention are based, in part, on the observation that typical conventional database security scheme mechanisms are integrated in either the application or database. Maintenance of the security scheme, such as changes and modifications to accessibility options, require changes to the application and/or database. Further, since the conventional security scheme is embedded in the application or the database, integrity of the conventional security scheme assumes accurate enumeration of each potential stream (access path) from the application into the database. Much like the weakest link of a chain, overlooking an application access stream may impose vulnerability on the conventional security scheme.

Embodiments of the invention, such as the exemplary configurations and segregation of duties depicted in further detail below, substantially overcome the deficiencies outlined above with respect to data level security in data management and retrieval environments, such as relational database management systems. Particular configurations of the invention employ a security filter for intercepting database streams, such as data access transactions, between an application and the a data repository, such as a relational database. Such an implementation deploys a security filter between the application and database, and observes, or "sniffs" the stream of transactions between the application and the database. The exemplary security filter, by interrogating the transactions, provides a content-aware capability for seamlessly and nondestructively enforcing data level security.

A security policy, codifying security requirements between the users and the tables of the database, employs a plurality of rules concerning restricted and allowable data items. The security filter intercepts data access transactions and determines if the transaction triggers the rules of the security policy. If the "sniffed" transactions indicate restricted data items, the security filter modifies the transaction to eliminate only the restricted data items, and otherwise allows the transaction to pass with the benign data items. The modified transaction is receivable by the application or the database by the same functions and methods which would have received the unmodified, unfiltered transaction stream, therefore allowing processing to continue unhindered by the security filter.

The data access transaction, or transaction stream, may be either a data request from the application to the database, or a response from the database to the application. The security filter modifies a request by analyzing a query syntax conveyed in the transaction, such as a SQL (Structured Query Language) operation, and determining additional SQL qualifiers to eliminate restricted data items from the data items purported to be retrieved by the transaction. The security filter modifies a response by analyzing data already retrieved, such as a row set corresponding to an SQL query, and identifying rows including restricted data items. The security filter eliminates the rows having the restricted data items, and rebuilds the row set with a subset of only benign rows having unrestricted data items. The security filter then transports the filtered transaction to the user as the query response. Therefore, the security filter provides data level security without changes to the applications or database (data schemas) by intercepting database requests and/or responses and modifying the transaction streams accordingly.

In further detail, the system of the present invention teaches method of security enforcement for a persistent data repository, such as a relational database, which intercepts a data access transaction between a user application and a data repository having a plurality of data items, i.e. tables (objects) containing rows of attributes. The security filter intercepts the data access transaction in a nonintrusive manner to determine if the intercepted data access transaction corresponds to the security policy. The nonintrusive manner of interception is undetectable to both the user application and the data repository. The predefined security policy is indicative of restricted data items in the data repository to which the user/application is prohibited access. Based on the security policy, the security filter limits the data access transaction by modifying the data access transaction according to the security policy, such that data indications (i.e. retrieved fields and/or query values) in the data access transaction, corresponding to restricted data items, are modified or eliminated in the resulting data access transaction.

The security policy employed for filtering the transactions has rules, in which each of the rules includes an object, a selection criteria of attributes, and an action indicative of the disposition of data items in the transaction. The actions are selectively indicative of modifications to the data access transaction, in which the modifications further include attributes, operators, and operands, such that limiting involves identifying data items corresponding to the attributes, in which the attributes are each associated with an operator and an operand. By applying an operator specified for a particular data item to the operand specified for the data item, in relation to the data item sought, the security filter determines, as a result of applying the operator, whether to eliminate the identified data item.

The data access transaction may, in a particular configuration, be a data access statement operative to request data, in which limiting the transaction further includes identifying at least one rule, according to the security policy, corresponding to the data access statement. The identified rule purports to restrict access to the data items indicated by the data access statement by concatenating selection qualifiers to the data access statement which triggers the identified rule. The selection qualifiers are therefore operable to omit the restricted data items from the data access statement.

Modification of a request in which the data indications in the data access transactions are references to data items in the data repository involves limiting the request (transaction) by qualifying the references to generate a modified request indicative of only the unrestricted data items. The modified request is such that successive retrieval operations employing the qualified references do not retrieve restricted data items.

In a particular arrangement, intercepting the data access statement includes receiving an SQL query and limiting the SQL query by appending conditional selection statements to the SQL query, in which the limiter computes conditional selection statements, derived from the security policy, to generate the resulting data access transaction. The modification of the SQL query involves manipulating a parse tree representation of the query, rather than modifying a text string representation, by building a parse tree corresponding to the SQL query. The limiter then adds nodes in the parse tree corresponding to the appended conditional selection statements, and reprocesses the parse tree to generate the resulting data access transaction as a modified parse tree operable to eliminate the restricted data items in the query.

The data access transaction may also be, in another arrangement, a response, in which the data indications are rows of data (i.e. row set) retrieved from the data repository. In the case of such a response, limiting further includes identifying rows having restricted data items, and eliminating the identified rows from the data access transaction such that the resulting data access transaction is a modified data query response including rows without restricted data items. In the aforementioned arrangement in which the data access transaction is a data query response including a row set, limiting further involves comparing each of the rows in the row set to the rules of the security policy, and selectively eliminating rows in the row set including the restricted data items, based on the comparing, to generate a modified query response including a filtered row set. Thus, the data query response modifications occur on whole rows of the row set embodied in the query response.

The above described limitation operation may occur via either a proxy setup and regeneration of a login stream, or by nonintrusive direct modification of the stream. In the case of a proxy login, intercepting the data access transaction involves first establishing a proxy to the data repository on behalf of the user, and receiving the data access transaction as a row set under the proxy, thus terminating the user login connection and initiating the proxy login connection. Limiting then involves regenerating the resulting data access transaction as a reduced row set having a subset of the rows from the proxy row set, and transmitting the reduced row set to the user on behalf of the proxy.

In the non-proxy, or direct modification configuration, limiting the data access transaction further includes receiving a set of packets, in which the packets encapsulate the data access transaction according to layered protocols. The interrogation and modification of the packets occurs in a nondestructive manner with respect to the layered protocols. The security filter padding the packets for accommodating elimination of the restricted data items to generate the resulting data access transaction. Therefore, the generation of the resulting data access transaction preserves the encapsulating layered protocol associating the packets, and without employing a proxy for regenerating the sequence of packets.

The security filter embodying the system of the present invention performs the intercepting in a data path between a source of the data access transaction and a destination of the resulting data access transaction, such that limiting occurs in a component separate from the source and destination, therefore relieving the requesting application and the database from the burden of modification. The nonintrusive manner of the security filter is such that the intercepting and limiting occurs undetectably to both the source and the destination. Therefore, the requesting application and the receiving database operate on the SQL request or row set response expected in the absence of the security filter. Further, the component embodying the security filter may be separate from the source and destination in a separate network device than the components corresponding to the source and destination (i.e. application and database).

In another arrangement, the system of the present invention teaches a method for nonintrusive implementation of data level security enforcement by defining a security policy having rules, in which the rules further specify attributes and conditions, as in a typical SQL query. In this configuration, the interceptor in the security filter intercepts a data retrieval request, and compares the data retrieval request to the security policy. The interceptor determines if the data retrieval request corresponds to at least one of the rules of the security policy, and identifies, via a parse tree, selectivity operators indicative of the allowable data items to be retrieved. The limiter then modifies the parse tree according to the corresponding rule to generate a modified data retrieval request, and forwards the modified data retrieval request to the data repository for subsequent retrieval and transport to the requesting user.

The invention as disclosed above is described as implemented on a computer having a processor, memory, and interface operable for performing the steps and methods for providing nonintrusive database security as disclosed herein. Other embodiments of the invention include a computerized device such as a computer system, central processing unit, microprocessor, controller, electronic circuit, application-specific integrated circuit, or other hardware device configured to process all of the method operations disclosed herein as embodiments of the invention. In such embodiments, the computerized device includes an interface (e.g., for receiving data or more segments of code of a program), a memory (e.g., any type of computer readable medium), a processor and an interconnection mechanism connecting the interface, the processor and the memory. In such embodiments, the memory system is encoded with an application having components that when performed on the processor, produces a process or processes that causes the computerized device to perform any and/or all of the method embodiments, steps and operations explained herein as embodiments of the invention to allow execution of instructions in a computer program such as a Java, HTML, XML, C, or C++ application. In other words, a computer, processor or other electronic device that is programmed to operate embodiments of the invention as explained herein is itself considered an embodiment of the invention.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, with emphasis instead being placed upon illustrating the embodiments, principles and concepts of the invention.

FIG. 11 is an exemplary database object (table);

FIG. 12 is a security policy table depicting the security policy in the interceptor of FIGS. 1 and 3 for implementing the security policy with respect to FIG. 11;

FIG. 13 is a modification table in the limiter of FIG. 3; and

FIGS. 14A and 14B are an example of a parse tree operable for modification according to the security policy of FIG. 3.

DETAILED DESCRIPTION

Embodiments of the invention are based, in part, on the observation that typical conventional data security scheme mechanisms are integrated in either the application or database. Maintenance of the data security scheme, such as changes and modifications, require changes to the application and/or database. Further, since the conventional security scheme is embedded in the application or the database, integrity of the conventional security scheme assumes accurate enumeration of each potential stream from the application into the database. Much like the weakest link of a chain, overlooking an application access stream may impose a potential vulnerability on the conventional security scheme.

Particular configurations of the invention provide a nonintrusive data level security mechanism for intercepting database access streams, such as data access transactions, between an application and the a data repository, such as a relational database, without burdening the application and database with modifications for implementing the security policy. Such an implementation deploys a security filter between the application and database, and observes, or "sniffs" the stream of transactions between the application and the database. The exemplary security filter, by nonintrusively interrogating the transactions, provides a content-aware capability for seamlessly and nondestructively enforcing data level security.

A security policy, codifying security requirements for the users and table of the database, employs a plurality of rules concerning restricted and allowable data items. The security filter intercepts data access transactions and determines if the transaction triggers rules of the security policy. If the "sniffed" transactions indicate restricted data items, the security filter modifies the transaction to eliminate only the restricted data items, and otherwise allows the transaction to pass with the benign data items. Since the modifications performed by the security filter are nonintrusive and nondestructive, protocol layering (encapsulation) and normalization of the underlying information in the transaction is preserved. The security filter sends the modified transaction such that it is receivable by the application or the database by the same functions and methods which would have received the unmodified, unfiltered transaction stream.

Figure 1:
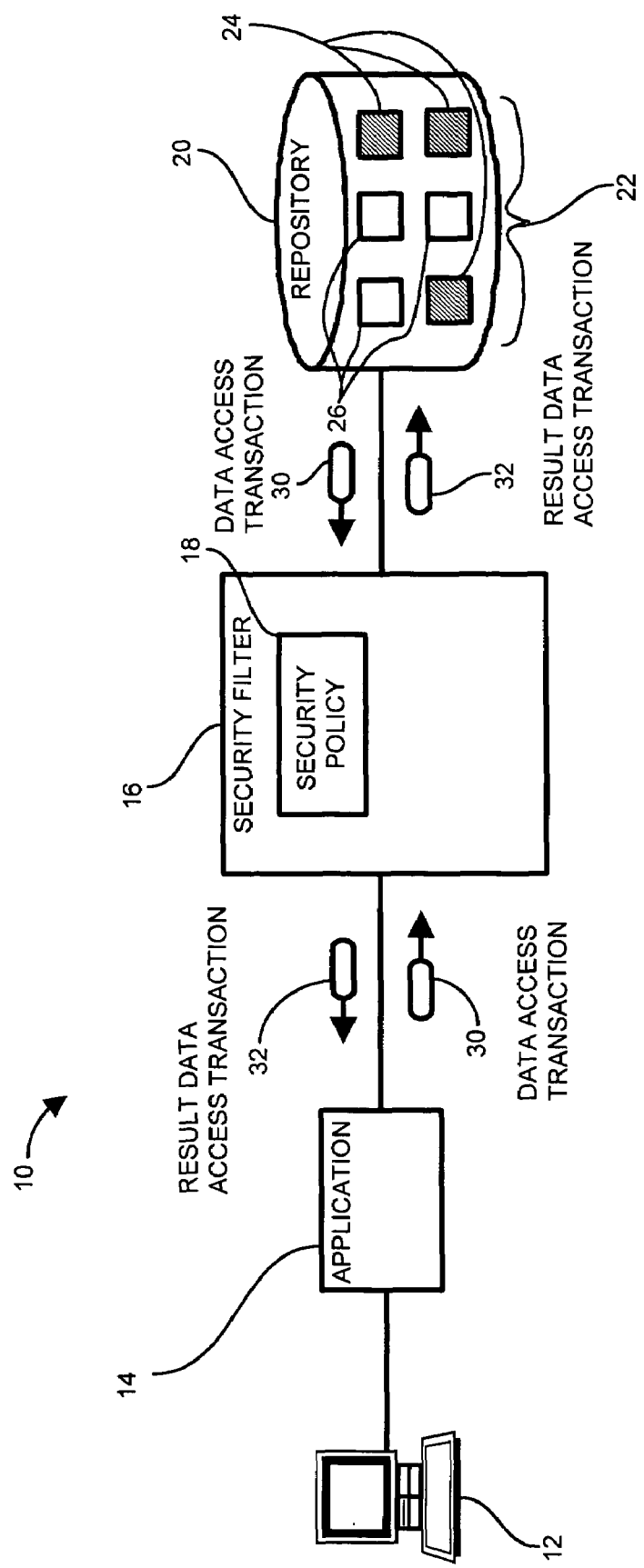
FIG. 1 is a block diagram of a data storage and retrieval environment suitable for use with the present invention.

FIG. 1 is a block diagram of a data storage and retrieval environment 10 suitable for use with the present invention. Referring to FIG. 1, the data storage and retrieval environment 10 includes an application 14 operable from a user or server computing device 12, a security filter 16 having a security policy 18, and a repository 20 for storing data items 22. The data items include restricted data items 24, and benign, or allowable data items 26, as will be discussed further below.

In operation, the security filter 16 receives a data access transaction 30 from either the application 14 or from the repository (i.e. database) 20. The security filter 16 processes the data access transaction 30 and generates a result data access transaction 32. The result data access transaction 32 does not reference or include any restricted data items 24. The data access transaction 30 may be either a data access request from the application 14 or a data query response from the repository 20. Depending on the issuer of the data access transaction 30, the security filter 16 analyzes and modifies the data access transaction 30 according to the security policy 18, and generates a result data access transaction 32 accordingly as a request or response, as will be discussed further below.

Figure 2:
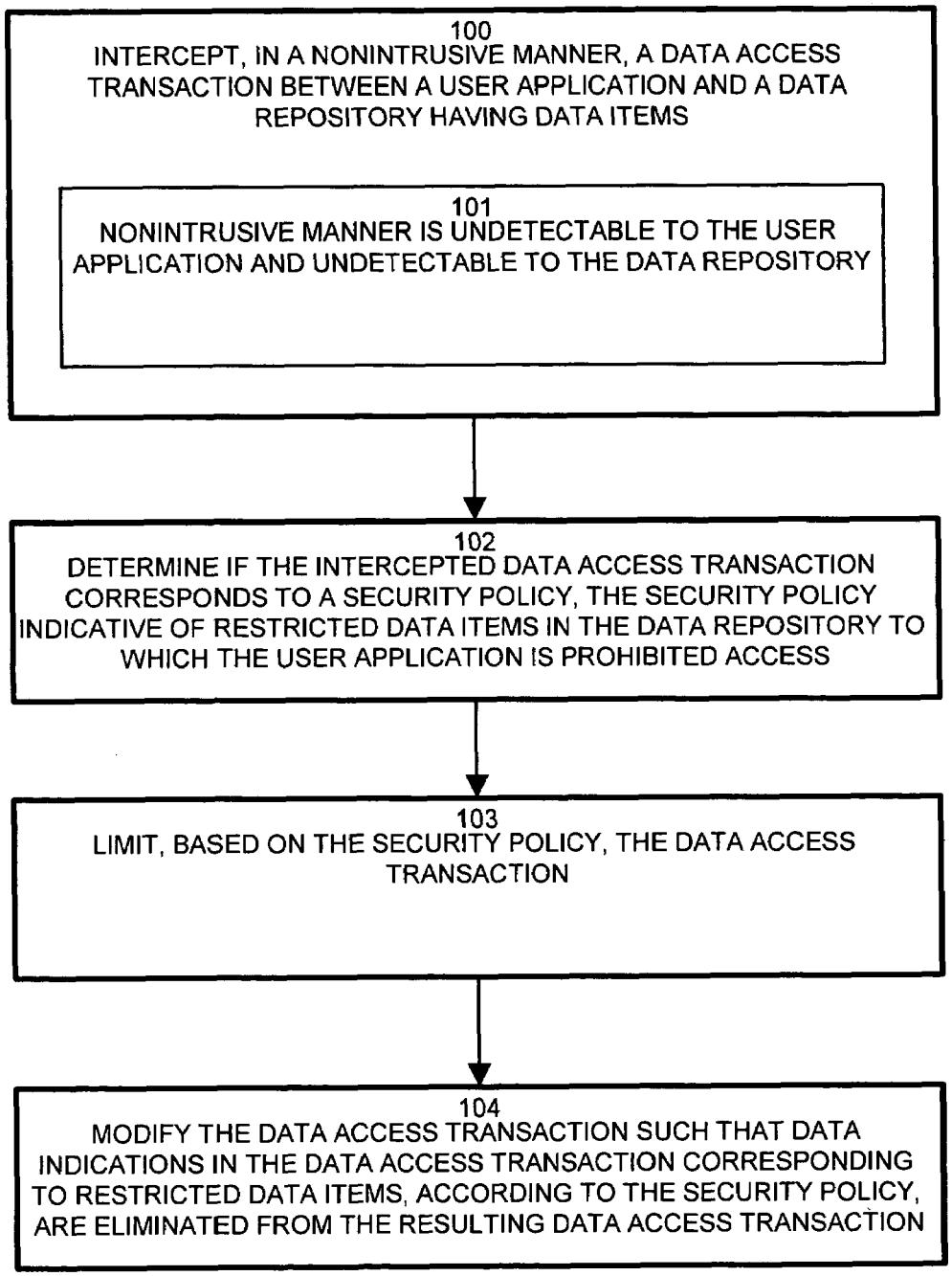
FIG. 2 is a flowchart of data storage and retrieval in the system in FIG. 1.

FIG. 2 is a flowchart of data storage and retrieval in the system in FIG. 1. Referring to FIGS. 1 and 2, the method of security enforcement for a persistent data repository in the environment 10 of FIG. 1 is shown. At step 100, the security filter 16 operates as a limiter and intercepts the data access transaction 30 between the user application 14 and the database 20. The database 20 has data items 22, which the security filter classifies as restricted or unrestricted. The security filter 16 intercepts the data access transaction 30 in a nonintrusive manner such that the filter 16 does not disturb protocol or other control information in the message 30. Therefore, the interception by the security filter 16 is undetectable to the recipient (database 20 or user application 14) of the result data access transaction 32, as depicted at step 101.

The security filter 16 determines if the intercepted data access transaction 30 corresponds to a security policy 18, as disclosed at step 102. The security policy 18 is indicative of restricted data items 24 in the data repository 20 to which the user application 14 is prohibited access. In a particular configuration, the security policy 18 embodies a series of rules, discussed further below, which are indicative of the restricted data items 24. The security filter 16 parses, or processes, the rules to enumerate which data items 26 to limit in the result data access transaction 32.

At step 103, based on the security policy 18, the security filter 16 limits the data access transaction by identifying, from the parsed rules in the security filter 16, the restricted data items 24 which trigger rules in the security policy 18. The security filter 16 therefore, identifies the requested data items 22 indicated by the data access transaction 30 and classifies the data items 22 as restricted 24 and allowed 26.

The security filter 16 modifies the data access transaction 30 such that data indications in the data access transaction 30 corresponding to the restricted data items 24, according to the security policy 16, are eliminated from the resulting data access transaction 30, as depicted at step 104. The data access transaction 30 contains indications of the referenced data items 22, which include references to the data items 22 if the data access transaction 30 is a request to the database 20, or a copy of the actual data items 22, if the data access transaction 30 is a response from the database 20. In either case, request or response, described further below, the security filter 16 limits the data access transaction 30 by modifying the indications in the data access transaction 30 to generate the result data access transaction 32. The result data access transaction 32, therefore, has no indications to restricted data items 24 and includes only allowed data items 26.

Figure 3:
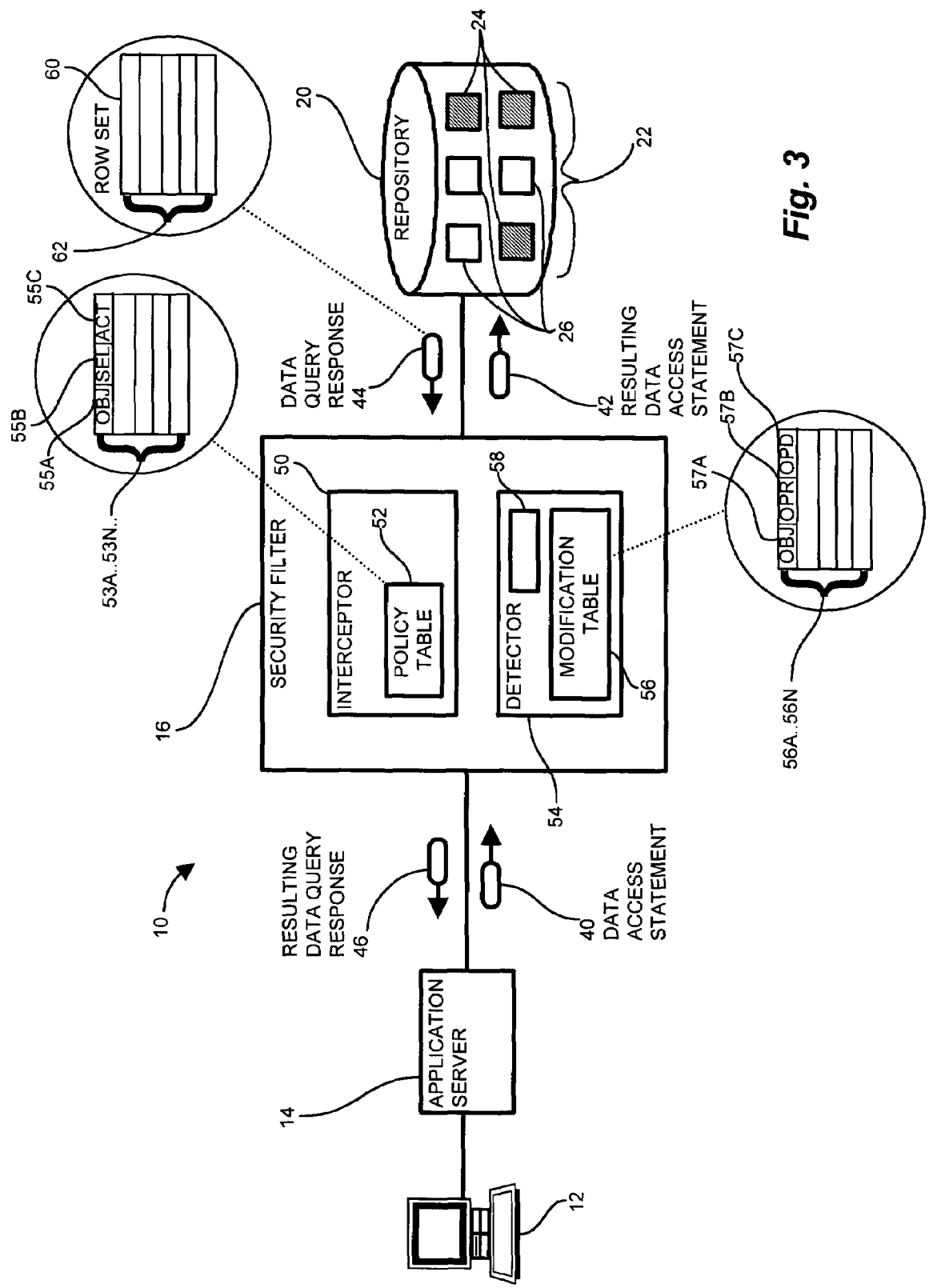
FIG. 3 is a block diagram of the data level security filter of FIG. 1 in greater detail.
Figure 4:
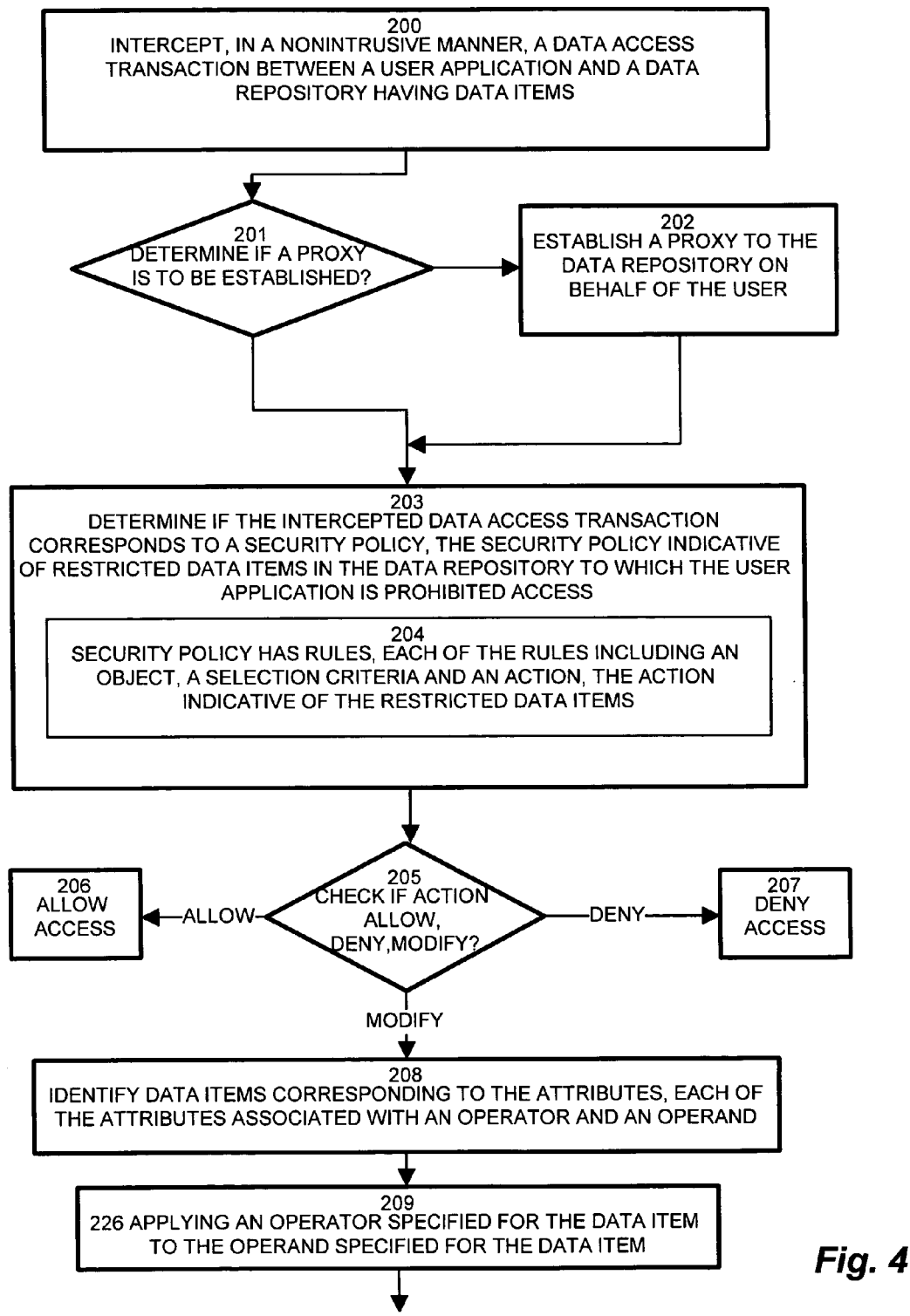
FIGS. 4-7 are a flowchart of a particular configuration depicting data request modification of the data storage and retrieval environment as in FIG. 2 in greater detail.
Figure 5:
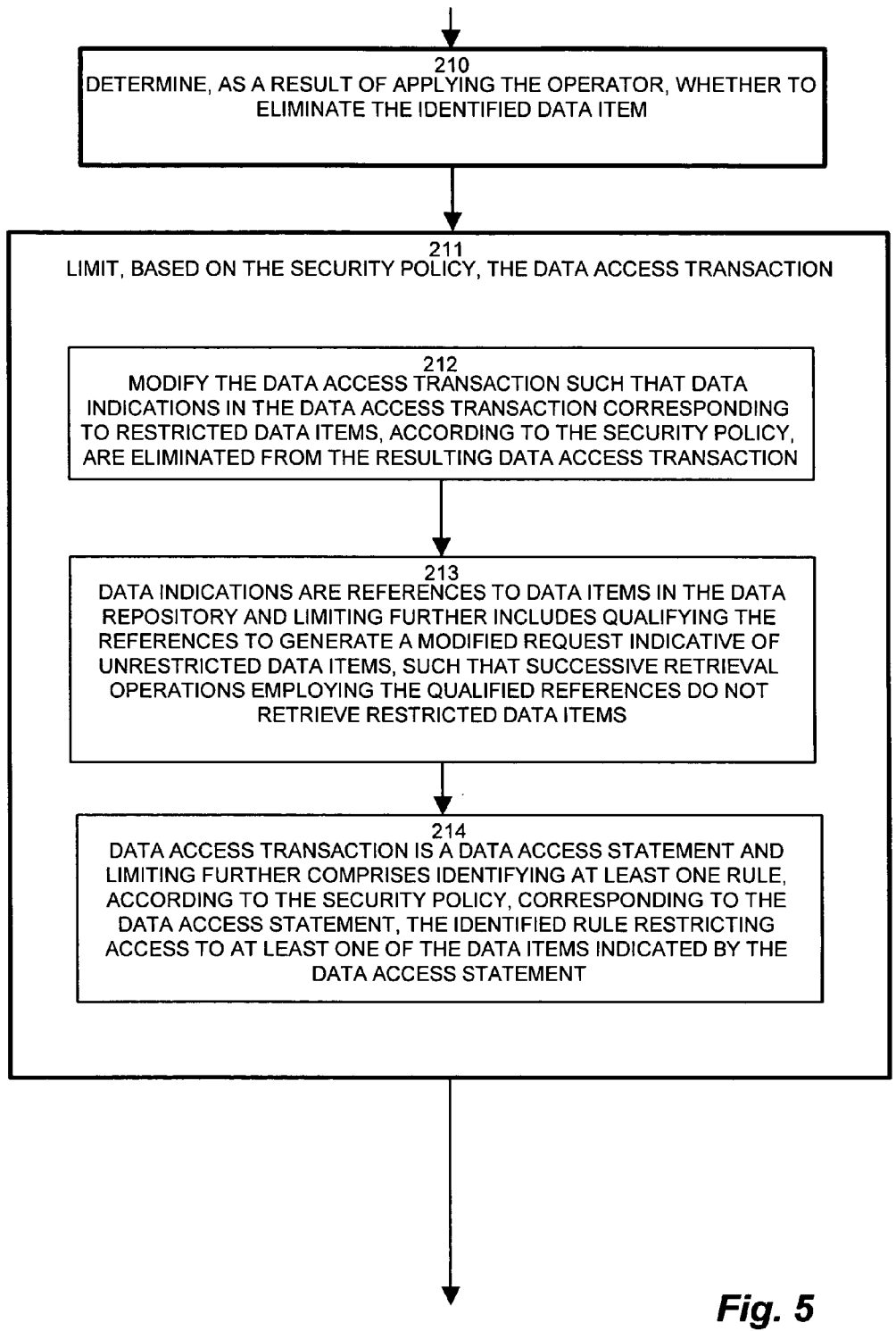
Figure 6:
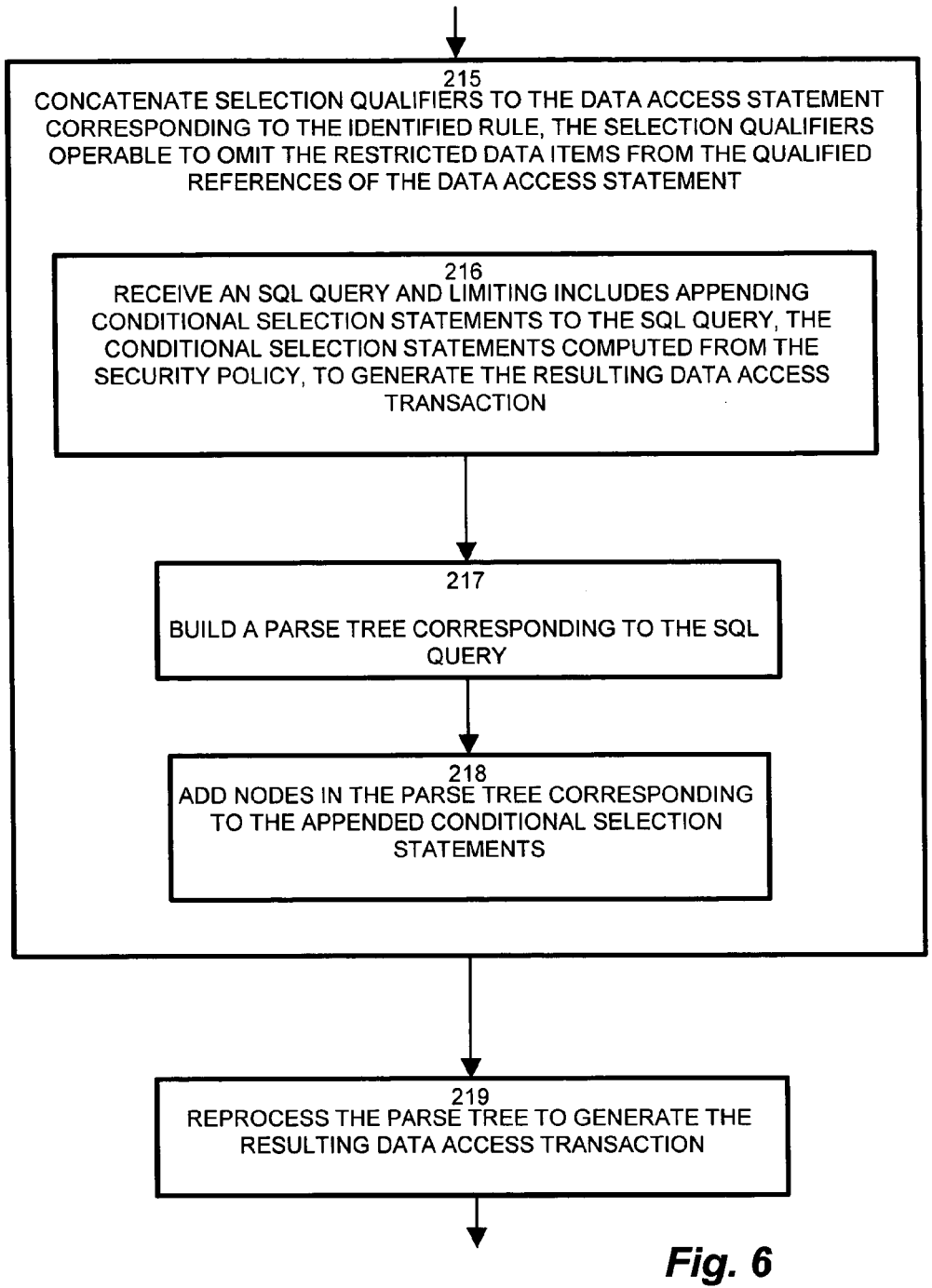
Figure 7:
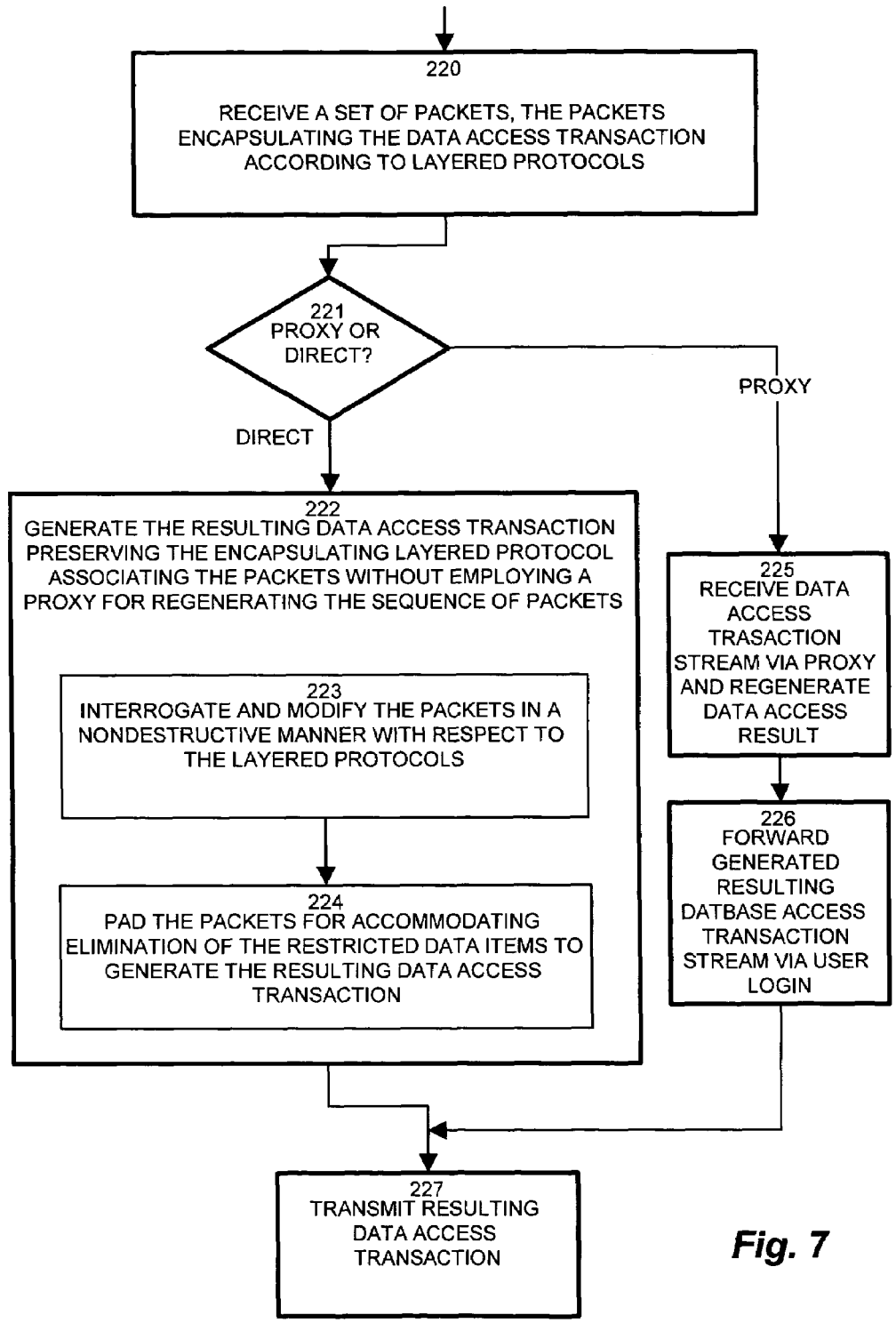

FIG. 3 is a block diagram of the data level security filter 16 of FIG. 1 in greater detail. Referring to FIG. 3, the security filter 16 further includes an interceptor 50 having a policy table 52, and a limiter 54 having a modification table 56. The policy table 52 enumerates rules 53A . . . 53N (53, generally), discussed further below, defining the security policy 18. The modification table 56 includes entries 56A . . . 56N, referenced by respective rules 52N, specifying indications to restricted data items 24 which the security filter eliminates, or modifies, from the resulting data access transaction 32.

The data access transaction 30 includes both data access statements 40, or requests to the database 20, and data query responses 44, or responses from the database 20. The rules 52A . . . 52N are applicable to both the requests 40 and the responses 44. Similarly, the modification entries 56A . . . 56N include modifications applicable to both requests 40 and responses 44. The security filter 16 is operable to receive a data access statement 40 and generate a resulting data access statement 42, and to receive a data query response 44 and generate a resulting data query response 46, by modifying requests 40 and responses 44 according to the policy table 52 and modification table 56, as will now be discussed in greater detail.

As indicated above, interception and limiting of a data access transaction 30 occurs to both the request 40, or data access statement, from the application 14 to the database, and to the response 44, or data query response, egressing from the database 20. In both cases, the security filter 16 implements the security policy 18 defined by the policy table 52 and the modification table 56, and implemented by the interceptor 50 and the limiter 54, respectively. However, in the former occurrence, in the exemplary configuration discussed below, the request 40 is in the form of a SQL query, which the limiter 54 modifies by appending condition statements. In the latter occurrence, the response 44 is a row set of database 20 results, which the limiter 54 modifies by selectively eliminating rows 53. One aspect of the modification to the data access statement 40 is allowing the database 20 to perform selection of only allowable data items 26, since the restricted data items 24 need not be fetched, thereby avoiding fetching and shortly thereafter discarding the restricted data items 24. Further, such modifications need not affect only selection statements, but extend to deletion and modification requests as well.

FIGS. 4-7 are a flowchart of a particular configuration depicting data request 40 modification of the data access transaction 30 in the data storage and retrieval environment 10 as in FIG. 2 in greater detail. Referring to FIGS. 3 and 4-8, beginning at step 200 the method of security enforcement for a persistent data repository 20 is shown including intercepting a data access transaction 30 between a user application 14 and a data repository 20, in a nonintrusive manner. The data access transaction 30 is a data access statement 40 (i.e. request), and is indicative of data items 22 in the database 20.

The security filter 16 may employ a proxy login for access to the repository 20. A proxy login facilitates regeneration of the stream of messages forming the transaction between the database 20 and the application 14. The proxy approach, therefore, terminates the stream from the application 14 to the security filter 16 and establishes a new stream from the security filter 16 to the database 20. Alternatively, the security filter 16 may examine and modify the individual messages (packets) without regenerating the stream or otherwise upsetting the protocol and/or encapsulation structure defined by the stream. Accordingly, at step 201, the security filter performs a check to determine whether to establish a proxy login to the database 20. If so, then the security filter 16 establishes a proxy to the data repository 20 on behalf of the user 14, as depicted at step 202.

In a particular implementation, the security filter 16 attempts to identify the querying user 12 via an additional handshaking exchange with the application 14. The additional exchange causes the application to transmit a message including the username or other identification of the requesting user. Accordingly, intercepting further includes establishing an identification exchange operable to transmit an identification token indicative of an application 14 user, and parsing the identification exchange to extract the identification token. This additional exchange allows the interceptor 50 to determine the particular user issuing the data access transaction 30, rather than relying on an application 14 specific identity which may be applicable to a plurality of users 12.

In either the proxy or non-proxy case, the security filter 16 determines if the intercepted data access transaction corresponds to the security policy 18, as disclosed at step 203. The security policy 16 is indicative of the restricted data items 24 in the data repository 20 to which the user application 14 is prohibited access. At step 204, the security filter 16 employs the interceptor 50 and the security policy table 52. The security policy 18 has rules 53 enumerated in the table 52, and discussed further below. Each of the rules 53 includes an object 55A, a selection criteria 55B and an action 55C, in which the action 55C is indicative of the restricted data items 24. The object 55A and selection criteria 55B, discussed below with respect to FIG. 12, indicate which database 20 objects (i.e. tables) are accessible to the application, and the selection criteria include attributes for comparison. Each rule in the policy table 52 includes an action 55C, which is one of allow, deny, or modify, to determine the disposition of the access attempt.

A check is performed, at step 205, to determine whether the interceptor 50 should allow or deny the access, or whether to modify the data access statement 40 by passing it to the limiter 54. If the action indicates an allow result, then the security filter 16 merely allows the data access statement 40 to proceed, as depicted at step 206. If the action 55C indicates a deny result, then at step 207 the security filter denies the access and terminates the data access statement 40. If the action 55C indicates a modify result, then the interceptor 54 invokes the limiter 54 to perform modification of the data access attempt 40.

The limiter 54 has a modification table 56 to modify data access statements and remove indications of restricted data items 24. The modification table 56 includes entries 56N, for identifying restricted data items 24. A modify result in the policy table 52 references a corresponding entry 56N in the modification table 56. Alternatively, a rule in the policy table 52 may reference multiple entries 56N in the modification table 56. Therefore, the actions 55C are selectively indicative of modifications, the modifications enumerated as entries 56N in the modification table 56, and further including attributes 57A, operators 57B, and operands 57C. The limiter 54, employing the modification table 56, identifies data items corresponding to the attributes, in which each of the attributes is associated with an operator and an operand, as depicted at step 208. The limiter 54 examines the query embodied by the data access statement 40, and applies the operator 57B specified for the data item to the operand 57C specified for the data item, 22 as depicted at step 209. For example, the operator 57B typically specifies an "IN" or "NOT IN" relationship of the data access statement 40 to the operand. If the data access statement 40 (i.e. SQL query) attempts to access a restricted data item 24, the modification entry 56N specifies the limiting of the data access statement 40. Accordingly, the limiter 54 determines, as a result of applying the operator 57B, whether to eliminate the identified data item 22 specified by the modification entry 56N, as depicted at step 210. The exemplary description herein characterizes the data access transaction 30 as an SQL query, operable for analysis by the limiter for computing applicability of the modification table 56. Alternate implementations are operable on alternate forms of data access statements 40, as will be apparent to those of skill in the art.

Having computed applicability of the modification table to a data access transaction 40 at hand, the limiter 54 then modifies the transaction 30 to avoid the restricted data items 24. In the particular exemplary configuration illustrated, the data access statement 40 is an SQL query, which conforms to the SQL syntax. Using SQL syntax constructs, the limiter 54 determines limitations, based on the security policy 18, to the data access transaction 40, as depicted at step 211. For example, in a database 20 of sensitive information, such as salary information in a human resources table, the security filter may limit access to locations in the particular state. In further detail, in the exemplary SQL configuration, the limiter 54 modifies the data access transaction 40 such that data indications in the data access statement 40 corresponding to restricted data items 24, according to the security policy 24, are eliminated from the resulting data access statement 42, as described at step 212.

The data indications described above, in the scope of modifying a data access transaction 30, or request, are references to data items 22 in the data repository 20, such that limiting further includes qualifying the references to generate a modified request, or resulting data access statement 42, indicative of unrestricted data items 26, such that successive retrieval operations employing the qualified references do not retrieve restricted data items 24, as depicted at step 213. Therefore, in request limitation operations in which the data access transaction 30 is a data access statement 40, limiting the transaction includes identifying at least one rule 53, according to the security policy, corresponding to the data access statement 40, in which the identified rule 53 restricts access to at least one of the data items 24 indicated by the data access statement 40, as shown at step 214.

Accordingly, the modification table 56 has an entry 56N which limits the query to the state of Massachusetts, having an operator of "IN" and an operator of "MA" for the "SALARY" attribute. In step 215, which includes steps 216-218, limiting is done by adding selection qualifiers to the data access statement 40 corresponding to the identified rule entry 56N, in which the selection qualifiers are operable to omit the restricted data items 24 from the qualified references of the data access statement 40. Therefore, in the exemplary SQL implementation, the limiter appends the syntactical expression "WHERE STATE="MA" to the data access statement 40.

Further to the SQL processing of the data access statement 40 (request), in the exemplary SQL configuration, as described above, intercepting the data access statement 40 includes receiving an SQL query and limiting includes appending conditional selection statements to the SQL query, in which the conditional selection statements are computed from the security policy 18, to generate the resulting data access transaction 42, as shown at step 216. Such appending includes, at step 217, building a parse tree corresponding to the SQL query. A parse tree is a data structure representative of the linear, pseudocode-like text string SQL query. The parse tree, as is known to those of skill in the art and described further below, includes nodes indicative of operators, field identifiers, and values, for rendering a Boolean result for a request of a data item 22. Accordingly, at step 218, limiting includes adding nodes into the parse tree corresponding to the appended conditional selection statements. Once modified to represent the additional indications avoiding the restricted data items 24, at step 219, the limiter reprocesses the parse tree to generate the resulting data access statement 42, i.e. the resulting data access transaction 32 based on a request from the application 14.

The security filter 16 is operable to forward the resulting data access statement 42 to the database 20 such that the non-intrusive manner remains undetectable and congruent with the resulting data access transaction 32 expected by the repository 20. Accordingly, at step 220, limiting the data access transaction 30 further includes identifying the received set of packets from the application 14, in which the packets encapsulate the data access transaction 30 according to layered protocols. Note that the data access transaction includes various forms of access to the data, such as read, update, and deletion attempts. At step 221, the limiter 54 performs a check to determine if the security filter established a proxy login for the current transaction.

At step 222, if the security filter does not employ a proxy, then at step 222, the limiter generates the resulting data access transaction to preserve the encapsulating layered protocol associating the packets without employing a proxy for regenerating the sequence of packets. The use of a proxy determines whether the response transaction 32 returns via the same user session directly to the user, or whether the proxy receives the session packets at the security filter and forwards the packets via a user session. The underlying generation of the result data transaction 32 still occurs. At step 223, the limiter interrogates and modifies the packets in a nondestructive manner with respect to the layered protocols, thus reserving the encapsulated information outside the SQL information in the packet payload. At step 224, the nondestructive manner may therefore include padding the packets for accommodating elimination of the restricted data items to generate the resulting data access transaction, such that the database 20 receives a syntactically operable SQL expression consistent with the original data access statement 40 augmented with the limiting statements to generate the resulting data access statement 42.

At step 221, if the security filter 16 employs a proxy login, then at step 225, the security filter 16 receives the data access transaction 30 stream via the proxy. The use of a proxy does not alter the underlying modification and filtering operations on either the request or the response. The proxy serves as an alternate login stream, or session, which operates between the repository 20 and the security filter 16. The user session then completes the connection to the application 14, thus completing the connection between the repository 20 and the application 14 via the user and proxy logins. At step 226, the security filter regenerates the data access result 32 from the proxy to the user login. At step 227, the security filter transmits the resulting data access transaction 32 to the application 14.

Figure 8:
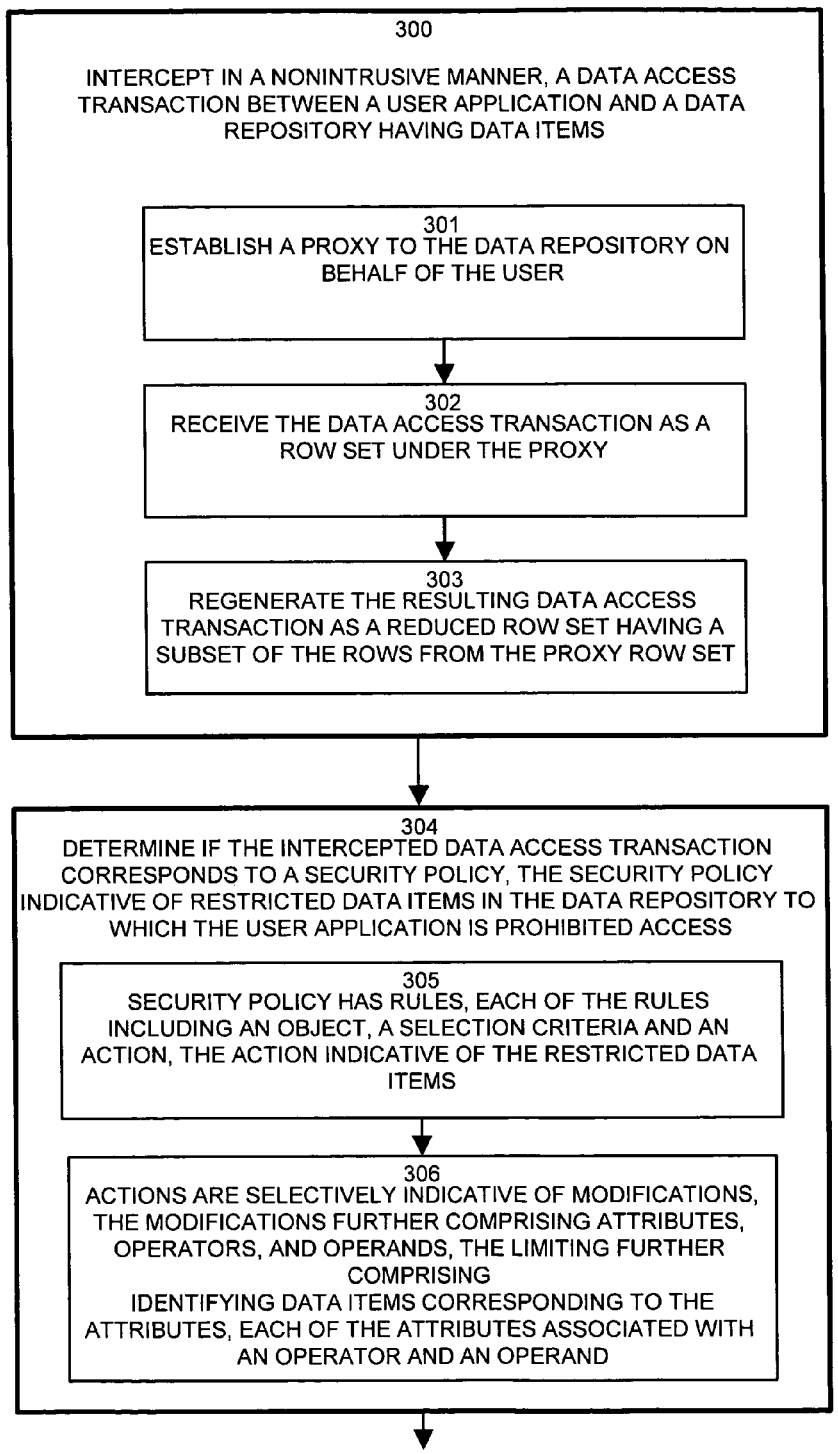
FIGS. 8-10 are a flowchart of a particular configuration depicting data response modification of the data storage and retrieval environment as in FIG. 2 in greater detail.
Figure 9:
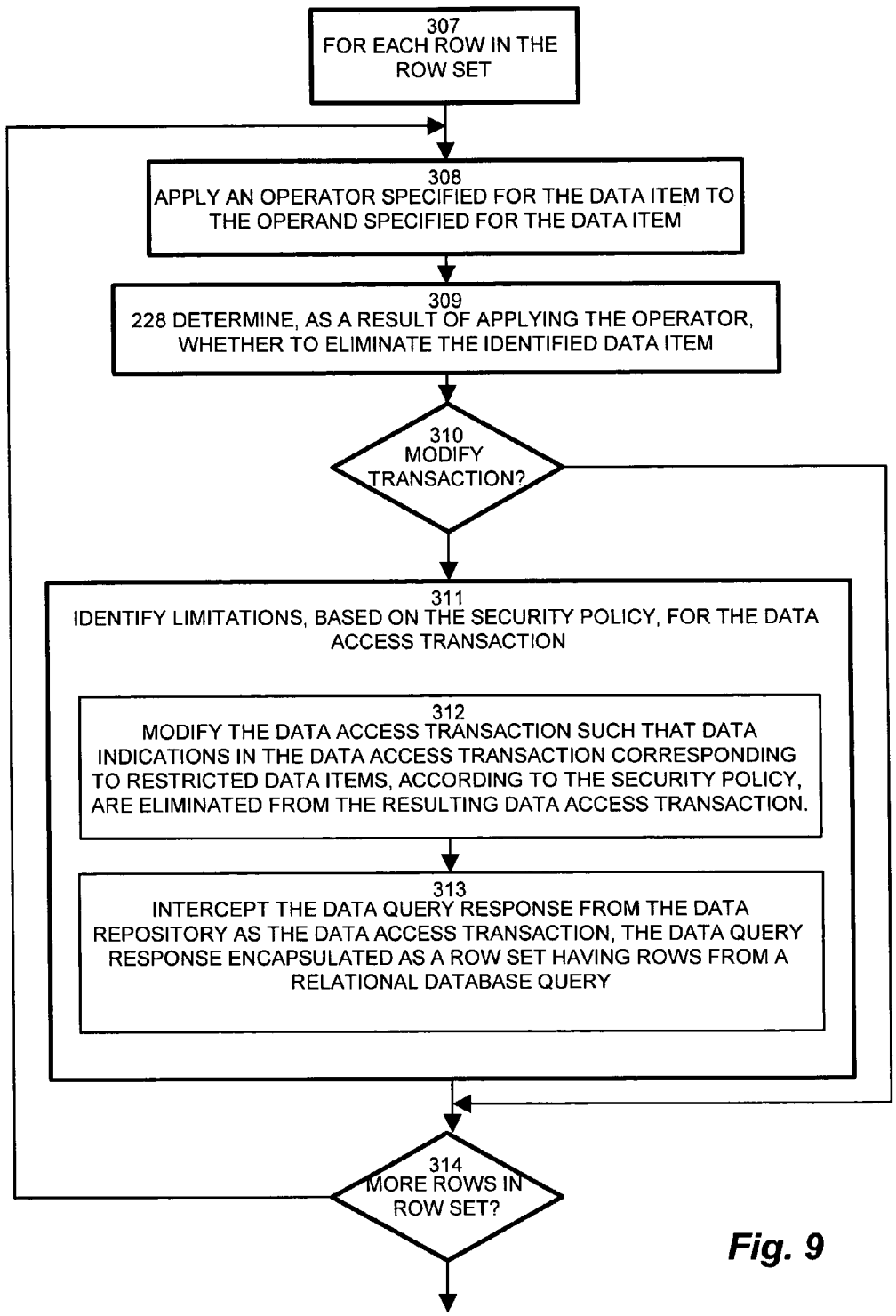
Figure 10:
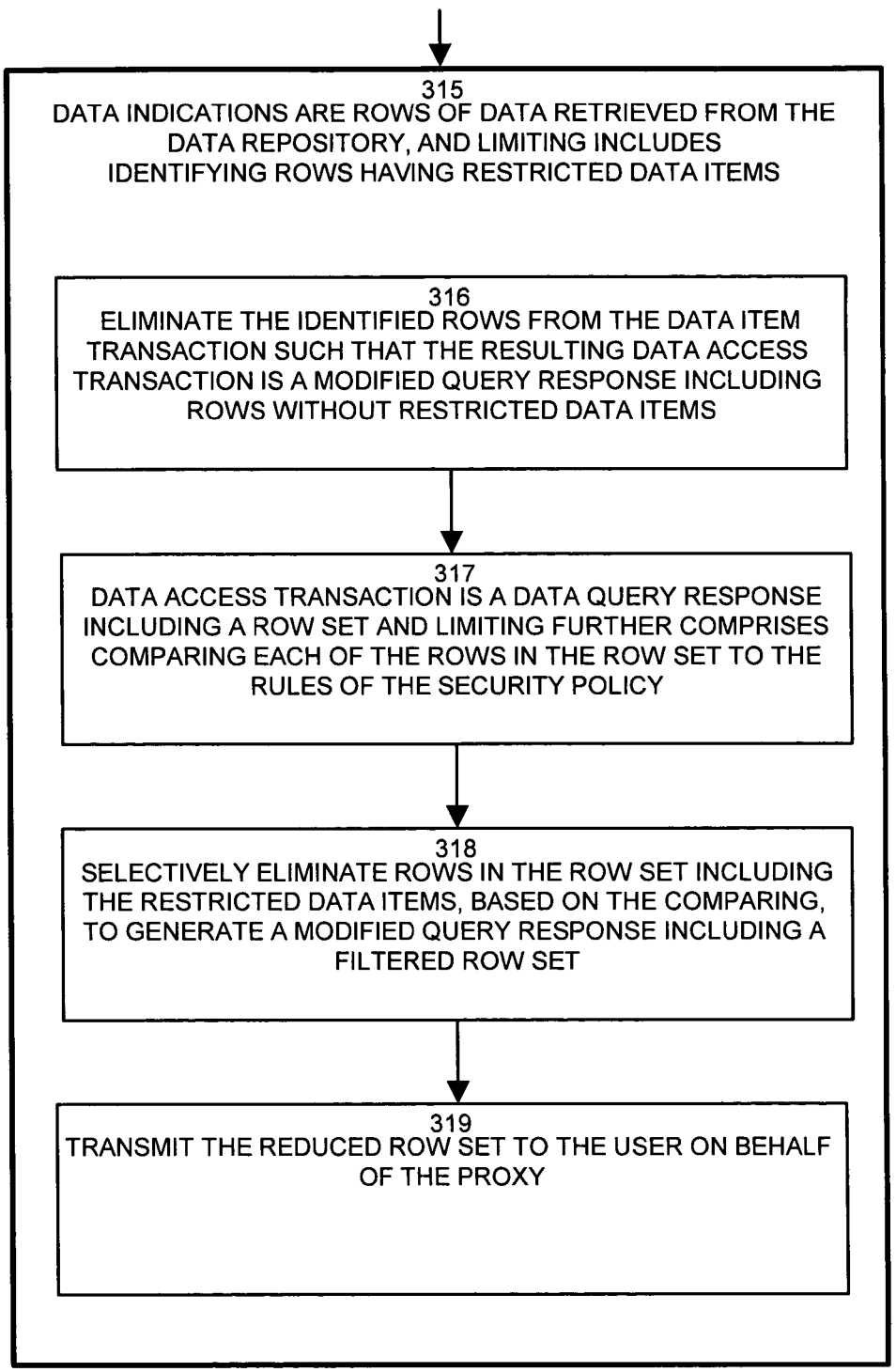

FIGS. 8-10 are a flowchart of a particular configuration depicting data response modification in the data storage and retrieval environment as in FIG. 2 in greater detail. The exemplary response modification intercepts the data access transaction 30 as a data query response 44 embodying a response by the database 20 to an SQL query. Accordingly, the method of security enforcement of a response for a persistent data repository 20 includes, at step 300, intercepting from the database 20, in a nonintrusive manner, a data access transaction 30 between a user application 14 and a data repository 20 having data items 22.

In the response modification example, the security filter generally establishes a proxy because of the procedural nature of modifying the fulfilled SQL query result. Accordingly, intercepting the data access transaction further includes establishing a proxy to the data repository 20 on behalf of the user 14, as depicted at step 301. The security filter, at step 302, receives the data access transaction as a row set under the proxy. The row set is a tabular data representation of the response to the query embodied in the requesting data access transaction corresponding to the data query response 44. Each row in the row set is an atomic unit of data expected by the requesting application 14. Therefore, modifications to the row set are made in the form of whole rows. Accordingly, regenerating the resulting data access transaction occurs as a reduced row set having a subset of the rows from the proxy row set, as shown at step 303.

In further detail, at step 304, the interceptor 50 processes the data query response 44 (i.e. transaction 30) to determine if the intercepted data access transaction 30 corresponds to the security policy 18, in which the security policy 18 is indicative of restricted data items 24 in the data repository 20 to which the user application 14 is prohibited access. At step 305, the security policy 18 embodies a policy table 52 in the interceptor 50, similar to the request sequence thread above, in which the security policy 18 has rules 52N codified in the policy table 52, each of the rules 52N including an object, a selection criteria and an action, the action indicative of the restricted data items 24.

As with the request modification example above, at step 306, the actions are selectively indicative of modification entries 56N in the modification table 56, in which the modification table entries 56N include attributes, operators, and operands. In the event of a modify action, the limiter 54 identifies data items corresponding to the attributes, in which each of the attributes is associated with an operator and an operand.

The row set included in the data query response 44 includes rows of attributes gathered from database 20 tables via a query. The limiter 54 establishes an iteration to traverse each of the rows in the row set, as show at step 307. Accordingly, the limiter 54 scans the rows in the row set by applying the operator specified for the data item to the operand specified for the data item, as depicted at step 308. If an operand, or field value, from the modification entry 56N matches the corresponding attribute in a particular row, then at step 309, the limiter determines, as a result of applying the operator, whether to eliminate the identified data item, i.e. row. The operator is typically one of "IN" or "NOT IN," corresponding to the restricted data items 24. For example, in the human resource salary example above, rows without (i.e. "NOT IN") a state attribute having a value of "MA" include restricted data items.

The limiter 54 performs a check to determine whether to modify the transaction based on the determining of step 309, as depicted at step 310. If the check indicates modification, then at step 311, the limiter 54 limits based on the security policy, the data access transaction based on the security policy i.e. modification entry 56N.

The limiter 54 then modifies the data access transaction 30 such that data indications in the data access transaction 30 corresponding to restricted data items, according to the security policy 18, are eliminated from the resulting data access transaction 32, as depicted at step 312. In the present example, in which the interceptor 50 intercepted the data access transaction 40 as a data query response 44 from the data repository 20, the data query response 44 is encapsulated as a row set 60 having rows 62 from a relational database query. Accordingly, limiting includes discarding rows 62 in the row set 62 having the restricted data items 24 and transmitting the remaining rows 62 to the user as the resulting data access transaction 32, as described at step 313. The interceptor 50 performs a check for more rows, as depicted at step 314, and control reverts to step 308 if there are more rows 62 remaining.

In the exemplary configuration discussed, in the SQL row set 60 returning as the data query response 44 from the repository 20, the data indications are rows 62 of data retrieved from the data repository 20, and limiting involves identifying rows 62 having restricted data items 24, as depicted at step 315. At step 316, the limiter 54 modifies the row set 60 in the data access transaction 30 by eliminating the identified rows 62 from the data access transaction 30 such that the resulting data access transaction 32 is a modified query response including rows 62 without restricted data items 24.

In further detail, in the exemplary configuration in which the data access transaction is a data query response including a row set, the limiter 54 further limits the row set 60, derived from the loop of step 314, by comparing each of the rows 62 in the row set 60 to the rules of the security policy 18, as depicted at step 317, and selectively eliminating rows 62 in the row set 60 including the restricted data items 24, based on the comparing, to generate a modified query response including a filtered row set 60 as the resulting query response 46, as shown at step 318. The security filter 16 then transmits the reduced row set 60 included in the resulting query response 46 to the user application 14 on behalf of the proxy, as depicted at step 319.

FIGS. 11-14B show an exemplary security policy employed in limiting a database 20 query. Referring to FIGS. 3 and 11-14B, a contacts object 160, or table, includes sales contacts for particular states and regions, collectively organized by attributes 174 in a series of rows 162, as is common in relational databases operable to receive SQL queries. An exemplary policy table 152 and modification table 156 implement a security policy 18 which limits information about sales contacts to those users in the sales area, i.e. with a "need to know."

A user based in Massachusetts employing application U2 issues a data access statement 40 including the SQL query:
SELECT NAME, PHONE
FROM CONTACTS
WHERE REGION="NE"

To retrieve the names of sales contacts in the northeast. The security filter 16 receives the statement 40, and references the policy table 152 to determine a corresponding rule. The policy table 160 codifies the rules 53 concerning various database objects 22 according to attributes 153. For example, rule 53A allows all access attempts from the user at IP address 192.168.0.0. Similarly, rule 53C, being the last rule 53 entry, denies access to attempts not falling into previous rules. The policy table 52 includes a rule 53A corresponding to application U2, as shown by rule attribute 152A. Rule 53A is associated with the CONTACTS object 160, as shown by rule attribute 152B.

Rule 53B is triggered by the SELECT command into the CONTACTS object, as shown by the attributes 153, and indicates a MODIFY action 152C. In the case of a modify action, the policy table 152 references the modification table 156 for attribute specific information modifying the SQL data access statement 40. The rule 53B further references modification entry 156A, shown by index 152D. The modification entry 156A limits access to data items 22 when the state attribute 158A is one of the values "MA" or "RI" 158C, indicated by operand 158B. Therefore, the current data access statement 40 is to be limited to rows 162 indicative or contacts in MA or RI, the allowable data items 26.

Accordingly, the limiter 54 constructs a parse tree 158 corresponding to the data access statement 40, and modifies the parse tree 158 to reflect the limiting modification entry 156A. As indicated above, the parse tree 58 is a typical processing construct for implementing SQL based access, as is known to those of skill in the art. Accordingly, the exemplary implementation operates on the parse tree 158 representation, adding nodes to effect the additional selection statements corresponding to the triggered rules 53B and associated modification entries 156A. Alternate configurations are operable on other data structures, such as direct ASCII concatenation of the SQL query string or other operations.

The initial parse tree 158 includes nodes corresponding to the SELECT operation 170, and include the FIELDS 171 of NAME 172 and ATRIBUTE 174, the OBJECT CONTACTS 176, and the selection operation WHERE 178 REGION=NE 180. The modification entry 53B adds the selection criteria limiting the selection to states of MA and RI, to result in the result data access statement 42 embodying the SQL query:

SELECT NAME, PHONE
FROM CONTACTS
WHERE REGION="NE" AND
(STATE="MA" OR STATE="RI")

Accordingly, the limiter adds nodes to the parse tree 153 to effect the additional selection fields, shown by dotted line 190. Referring to FIG. 14B, the resulting parse tree 158' includes the conjunctive 182 operation, disjunctive node 184, and the value nodes 186, 188, thereby avoiding the restricted data items 24 in the resulting data access statement 42.

Alternate implementations include multiple objects (tables) in such a selection, and may also include table references as a modification entry 156N. For example, such a selection may attempt to limit the sales contact to the state of the querying user. Such an operation would involve obtaining the state of the querying user, referencing the state in a query on the contact table 160, and allowing rows 162 where the state of the querying user 12 matches the state attribute 174 in the table (object) 160. Such an operation, in SQL terms, involves addition of a FROM statement to perform a join on the contact table 160 and the table having the state of the querying user 12.

The information distribution system disclosed herein may encompass a variety of alternate deployment environments. In a particular configuration, the exemplary nonintrusive database security application discussed may be the SQL Guard application, marketed commercially by Guardium corporation of Waltham, Mass., assignee of the present application.

Those skilled in the art should readily appreciate that the programs and methods for providing nonintrusive database security as defined herein are deliverable to a processing device in many forms, including but not limited to a) information permanently stored on non-writeable storage media such as ROM devices, or b) information alterably stored on writeable storage media such as floppy disks, magnetic tapes, CDs, RAM devices, and other magnetic and optical media. The operations and methods may be implemented in a software executable object or as a set of instructions embedded in a computer program product. Alternatively, the operations and methods disclosed herein may be embodied in whole or in part using hardware components, such as Application Specific Integrated Circuits (ASICs), state machines, controllers or other hardware components or devices, or a combination of hardware, software, and firmware components.

While the system and method for providing nonintrusive database security has been particularly shown and described with references to embodiments thereof, it will be understood by those skilled in the art that various changes in form and details may be made therein without departing from the scope of the invention encompassed by the appended claims. Accordingly, the present invention is not intended to be limited except by the following claims.

What is claimed is:

1. A method of security enforcement for a persistent computer data repository comprising:
   intercepting, in a nonintrusive manner, a data access transaction between a user application and a data repository having data items, the nonintrusive manner gathering the data access transaction from a stream of data between the application and the data repository;
   determining a correspondence of the intercepted data access transaction to a security policy, the security policy indicative of restricted data items in the data repository to which the user application is prohibited access; and
   selectively limiting, based on the determined correspondence to the security policy, the data access transaction by modifying the data access transaction such that data indications, in the data access transaction, corresponding to restricted data items are modified in a resulting data access transaction according to the security policy, limiting the data access transaction further including:
   receiving a set of packets, the packets encapsulating the data access transaction according to layered protocols;
   interrogating and modifying the packets in a nondestructive manner with respect to the application layered protocols, the nondestructive manner preserving an expected application layer protocol encapsulation;
   padding the packets to emulate packets having a corresponding length as the restricted data items to generate the resulting data access transaction in a manner preserving encapsulation according to expected application based layered protocols;
   identifying rows in the packets having restricted data items, and
   eliminating the identified rows from the data access transaction such that the resulting data access transaction is a modified query response including rows without restricted data items, the resulting data access transaction returned to a requestor without restricted data items.

2. The method of claim 1 wherein the security policy has rules, each of the rules including an object, a selection criteria and an action, the action indicative of restricted data items.

3. The method of claim 1 wherein the data indications are references to data items in the data repository and limiting further includes qualifying the references to generate a modified request indicative of unrestricted data items, such that successive retrieval operations employing the qualified references do not retrieve restricted data items.

4. The method of claim 3 wherein the data access transaction is a data access statement operative to request data and limiting further comprises:
   identifying at least one rule, according to the security policy, corresponding to the data access statement, the identified rule restricting access to at least one of the data items indicated by the data access statement; and
   concatenating selection qualifiers to the data access statement corresponding to the identified rule, the selection qualifiers operable to omit the restricted data items from the qualified references of the data access statement.

5. The method of claim 1 wherein the data indications are rows of data retrieved from the data repository.

6. The method of claim 5 wherein the data access transaction is a data query response including a row set and limiting further comprises:
   comparing each of the rows in the row set to the rules of the security policy; and
   selectively eliminating rows in the row set including the restricted data items, based on the comparing, to generate a modified query response including a filtered row set.

7. The method of claim 2 wherein the actions are selectively indicative of modifications, the modifications further comprising attributes, operators, and operands, the limiting further comprising
   identifying data items corresponding to the attributes, each of the attributes associated with an operator and an operand;
   applying an operator specified for the data item to the operand specified for the data item; and
   determining, as a result of applying the operator, whether to eliminate the identified data item.

8. The method of claim 1 wherein the nonintrusive manner is undetectable to the user application and undetectable to the data repository.

9. The method of claim 1 wherein generating the resulting data access transaction preserves the encapsulating layered protocol associating the packets without employing a proxy for regenerating the sequence of packets.

10. The method of claim 4 wherein intercepting the data access statement includes receiving an SQL query and limiting includes appending conditional selection statements to the SQL query, the conditional selection statements computed from the security policy, to generate the resulting data access transaction.

11. The method of claim 10 further comprising:
    building a parse tree corresponding to the SQL query;
    adding nodes in the parse tree corresponding to the appended conditional selection statements; and
    reprocessing the parse tree to generate the resulting data access transaction.

12. The method of claim 6 wherein intercepting the data query response further comprises:
    intercepting the data query response from the data repository as the data access transaction, the data query response encapsulated as a row set having rows from a relational database query, and further wherein limiting includes discarding rows in the row set having restricted data items and transmitting the remaining rows to the user as the resulting data access transaction.

13. The method of claim 1 wherein the nonintrusive manner is such that the intercepting and limiting occurs undetectable to both the source and the destination of the data access transaction.

14. The method of claim 1 wherein intercepting further comprises:
    establishing an identification exchange intended for interception and operable to transmit an identification token indicative of an application user; and
    parsing, as part of the intercepting, the identification exchange to extract the identification token, wherein the identification exchange is benign to the data repository.

15. The method of claim 1 wherein intercepting occurs in a data path between a source of the data access transaction and a destination of the resulting data access transaction, and limiting occurs in a component separate from the source and destination.

16. The method of claim 15 wherein the component separate from the source and destination is a separate network device than the components corresponding to the source and destination.

17. The method of claim 1 wherein the restricted data items are eliminated from the resulting data access transaction.

18. A method for nonintrusive implementation of computer data level security enforcement comprising:

defining a security policy between an application and a data repository, the security policy having rules indicative of restricted data items, the rules associated with attributes and conditions;

identifying an entry point between the data repository and the application;

deploying a security filter at the entry point, the security filter operable to receive data manipulation messages between the application and the data repository; the security filter further operable to limit data exposure by the data repository by selectively modifying the data manipulation messages into conformance with the security policy, the limiting further comprising:

sniffing the entry point to determine data manipulation messages;

intercepting the sniffed data manipulation messages in a nondestructive manner with respect to the layered protocols, the nonintrusive manner gathering the data access transaction from a stream of data between the application and the data repository, the nondestructive manner preserving expected application based layered protocols;

comparing the sniffed messages to the rules in the security policy and determine if the sniffed data manipulation message include restricted data items;

determining a match between the sniffed messages and at least one of the rules of the security policy;

selectively modifying, based on the determined match between the rules and the data manipulating message, the data manipulation message to remove the matching restricted data item, modifying further including:

building a parse tree corresponding to the SQL query;

adding nodes in the parse tree corresponding to the appended conditional selection statements; and reprocessing the parse tree to generate the resulting data access transaction in a manner preserving encapsulation according to expected application based layered protocols, the resulting data access transaction returned to a requestor without restricted data items.

19. The method of claim 18 wherein determining comprises comparing attributes of the data manipulation messages with operators and operands in the compared rules, the operators and operands indicative of restricted data items in the data repository.

20. The method of claim 18 wherein modifying further comprises:

reconstructing a request query corresponding to a query syntax; and adding limiters to the request query corresponding to the matching rules of the security policy, the adding performed in a nondestructive manner such that the modification is undetectable to the data repository.

21. The method of claim 18 wherein modifying further comprises:

identifying a data retrieval response encapsulated in a layered protocol on the data manipulation message; and reconstructing the data retrieval response by deleting restricted data items from the data retrieval response, the reconstructing performed in a nondestructive manner undetectable to the application and conforming to the encapsulating layered protocol.

22. A security filter device for security enforcement for a persistent computer data repository comprising:

an interceptor in the security filter operable to intercept, in a nonintrusive manner, a data access transaction between a user application and a data repository having data items, the nonintrusive manner gathering the data access transaction from a stream of data between the application and the data repository;

a security policy table responsive to the interceptor to determine a correspondence of the intercepted data access transaction to the security policy table, the security policy table indicative of restricted data items in the data repository to which the user application is prohibited access; and a limiter operable to selectively limit, based on the determined correspondence to the security policy, the data access transaction by modifying the data access transaction such that data indications, in the data access transaction and corresponding to restricted data items, according to the security policy table, are modified in a resulting data access transaction, the security filter operable to manipulate the resulting data access transaction in a nonintrusive manner such that modifications performed on the data access transaction are undetectable to the user application and undetectable to the data repository, the data access transaction being contained in a set of packets, the limiter further operable to:

receive the set of packets, the packets encapsulating the data access transaction according to application based layered protocols; and interrogate and modify the packets in a nondestructive manner with respect to the layered protocols, the nondestructive manner preserving expected application based layered protocols;

pad the packets to emulate packets having a corresponding length as the restricted data items to generate the resulting data access transaction in a manner preserving encapsulation according to expected application based layered protocols;

identify rows in the packets having restricted data items; and eliminate the identified rows from the data access transaction such that the resulting data access transaction is a modified query response including rows without restricted data items, the resulting data access transaction returned to a requestor without restricted data items.

23. The security filter device of claim 22 wherein the security policy has table rules, each of the rules including an object, a selection criteria and an action, the action indicative of restricted data items.

24. The security filter device of claim 22 wherein the data indications are references to data items in the data repository and the limiter is operable to qualifying the references to generate a modified request indicative of unrestricted data items, such that successive retrieval operations, from the data repository, employing the qualified references do not retrieve restricted data items.

25. The security filter device of claim 24 wherein the data access transaction is a data access statement operative to request data, wherein:

the interceptor is operable identify at least one rule, according to the security policy, corresponding to the data access statement, the identified rule restricting access to at least one of the data items indicated by the data access statement; and the limiter is operable to concatenate selection qualifiers to the data access statement corresponding to the identified rule, the selection qualifiers operable to omit the restricted data items from the qualified references of the data access statement.

26. The security filter device of claim 22 wherein the data indications are rows of data retrieved from the data repository, wherein:
the interceptor is operable to identify rows having restricted data items, and
the limiter is operable to eliminate the identified rows from the data access transaction such that the resulting data access transaction is a modified query response including rows without restricted data items.

27. The security filter device of claim 26 wherein the data access transaction is a data query response including a row set wherein:
the interceptor is operable to compare each of the rows in the row set to the rules of the security policy; and
the limiter is operable to selectively eliminate rows in the row set including the restricted data items, based on the comparing, to generate a modified query response containing a filtered row set.

28. The security filter device of claim 23 wherein the actions are selectively indicative of modifications, the modifications further comprising attributes, operators, and operands, wherein the limiter is operable to:
identify data items corresponding to the attributes, each of the attributes associated with an operator and an operand;
apply an operator specified for the data item to the operand specified for the data item; and
determine, as a result of applying the operator, whether to eliminate the identified data item.

29. The security filter device of claim 22 wherein the data access transaction is contained in a set of packets wherein the limiter is operable to:
receive the set of packets, the packets encapsulating the data access transaction according to layered protocols;
interrogate and modify the packets in a nondestructive manner with respect to the layered protocols; and
pad the packets for accommodating elimination of the restricted data items to generate the resulting data access transaction.

30. The security filter device of claim 29 wherein the resulting data access transaction conforms to the encapsulating layered protocol associating the packets.

31. The security filter device of claim 25 wherein the data access statement is an SQL query and wherein the limiter is operable to append conditional selection statements to the SQL query, the conditional selection statements computed from the security policy, to generate the resulting data access transaction.

32. The security filter device of claim 31 further comprising a parse tree, the interceptor operable to build the parse tree corresponding to the SQL query, wherein the limiter is further operable to add nodes to the parse tree corresponding to the appended conditional selection statements; and reprocessing the parse tree to generate the resulting data access transaction.

33. The security filter device of claim 22 wherein the interceptor is operable to intercept the data query response from the data repository as the data access transaction, the data query response encapsulated as a row set having rows from a relational database query, wherein the limiter is operable to discard rows in the row set having restricted data items and transmit the remaining rows to the user as the resulting data access transaction.

34. The security filter device of claim 22 wherein the user application and the data repository define a data path between a source of the data access transaction and a destination of the resulting data access transaction, wherein the security filter is disposed in a component separate from the source and destination.

35. The security filter device of claim 34 wherein the component separate from the source and destination is a separate network device than the components corresponding to the source and destination.

36. A method for nonintrusive implementation of computer data level security enforcement comprising:
defining a security policy having rules, the rules further specifying attributes and conditions;
intercepting a data retrieval request in a nonintrusive manner, the nonintrusive manner gathering the data access transaction from a stream of data between an application and a data repository;
comparing the data retrieval request to the security policy;
determining a correspondence between the data retrieval request and at least one of the rules of the security policy;
identifying, via a parse tree, selectivity operators indicative of the data to be retrieved;
selectively modifying, based on the determined correspondence, the parse tree according to the corresponding rule to generate a modified data retrieval request; and
forwarding the modified data retrieval request to the data repository for subsequent retrieval and transport to the requesting user, modifying the parse tree further including
building a parse tree corresponding to the SQL query;
adding nodes in the parse tree corresponding to the appended conditional selection statements; and
reprocessing the parse tree to generate the resulting data access transaction by modifying the packet content being delivered to the database consistent with the original data retrieval request, the generated resulting data access transaction preserving encapsulation according to application based layered protocols expected in the original data retrieval request, the resulting data access transaction returned to a requester without restricted data items.

37. A computer program product having a computer readable storage medium operable to store computer program logic embodied in computer program code including a set of instructions responsive to a processor encoded thereon that, when executed by the processor, cause the computer to perform steps for implementing security enforcement in a persistent data repository comprising:
intercepting, in a nonintrusive manner, a data access transaction between a user application and a data repository having data items; the nonintrusive manner gathering the data access transaction from a stream of data between an application and a data repository;
determining if the intercepted data access transaction corresponds to a security policy, the security policy indicative of restricted data items in the data repository to which the user application is prohibited access; and
limiting, based on the security policy, the data access transaction by modifying the data access transaction such that data indications, in the data access transaction and corresponding to restricted data items are modified in a resulting data access transaction according to the security policy, intercepting the data access statement including receiving an SQL query and limiting including appending conditional selection statements to the SQL query, the conditional selection statements computed from the security policy, to generate the resulting data access transaction, further comprising:
building a parse tree corresponding to the SQL query;
adding nodes in the parse tree corresponding to the appended conditional selection statements; and
reprocessing the parse tree to generate the resulting data access transaction, the generated resulting data access transaction preserving encapsulation according to application based layered protocols expected in the original data retrieval request, the resulting data access transaction returned to a requestor without restricted data items.

38. A computer readable storage medium operable to store computer program logic embodied in computer program code including a set of instructions responsive to a processor encoded thereon that, when executed by the processor, cause the computer to perform a method of security enforcement for a persistent data repository comprising:
program code intercepting, in a nonintrusive manner, a data access transaction between a user application and a data repository having data items, the nonintrusive manner gathering the data access transaction from a stream of data between the application and the data repository;
program code determining a correspondence of the intercepted data access transaction to a security policy, the security policy indicative of restricted data items in the data repository to which the user application is prohibited access; and
program code selectively limiting, based on the determined correspondence to the security policy, the data access transaction by modifying the data access transaction such that data indications, in the data access transaction, corresponding to restricted data items, according to the security policy, are modified in a resulting data access transaction, intercepting occurring in a data path between a source of the data access transaction and a destination of the resulting data access transaction, and limiting occurring in a component separate from the source and destination, the component separate from the source and destination being a distinct network device from the components corresponding to the source and destination such that the nonintrusive manner is undetectable to the user application and undetectable to the data repository by preserving encapsulation according to expected application based layered protocols in the resulting data access transaction, limiting the data access transaction further including:
receiving a set of packets, the packets encapsulating the data access transaction according to layered protocols;
interrogating and modifying the packets in a nondestructive manner with respect to the application layered protocols, the nondestructive manner preserving an expected application layer protocol encapsulation;
padding the packets to emulate packets having a corresponding length as the restricted data items to generate the resulting data access transaction in a manner preserving encapsulation according to expected application based layered protocols;
identifying rows in the packets having restricted data items, and
eliminating the identified rows from the data access transaction such that the resulting data access transaction is a modified query response including rows without restricted data items, the resulting data access transaction returned to a requestor without restricted data items.

39. A data security filter device for security enforcement for a persistent data repository in a computer network, the data security filter device comprising:

means for intercepting, in a nonintrusive manner, a data access transaction between a user application and a data repository having data items, the nonintrusive manner being undetectable to the user application and undetectable to the data repository, the nonintrusive manner gathering the data access transaction from a stream of data between the application and the data repository;
means for determining a correspondence of the intercepted data access transaction to a security policy, the security policy indicative of restricted data items in the data repository to which the user application is prohibited access; and
means for selectively limiting, based on the determined correspondence to the security policy, the data access transaction by modifying the data access transaction such that data indications, in the data access transaction, corresponding to restricted data items, according to the security policy, are modified in a resulting data access transaction;
the data indications being rows of data retrieved from the data repository, such that the means for limiting further comprises:
means for receiving a set of packets, the packets encapsulating the data access transaction according to layered protocols;
means for interrogating and modifying the packets in a nondestructive manner with respect to the layered protocols the nondestructive manner preserving expected application based layered protocols;
means for identifying rows having restricted data items;
means for eliminating the identified rows from the data access transaction such that the resulting data access transaction is a modified query response including rows without restricted data items;
means for padding the packets to emulate packets having a corresponding length as the restricted data items to generate the resulting data access transaction, generating the resulting data access transaction preserving the encapsulating layered protocol associating the packets without employing a proxy for regenerating the sequence of packets;
the data access transaction being a data query response including a row set such that the means for limiting further includes:
means for comparing each of the rows in the row set to the rules of the security policy;
means for identifying rows in the packets having restricted data items, and means for selectively eliminating rows in the row set including the restricted data items, based on the comparing, to generate a modified query response including a filtered row set corresponding to packets expected according to application based layered protocols of the intercepted data access transaction such that the resulting data access transaction is a modified query response including rows without restricted data items, the resulting data access transaction returned to a requestor without restricted data items.

40. The method of claim 1 wherein the nonintrusive manner is undetectable to the user application and undetectable to the data repository, the nonintrusive manner such that the intercepting and limiting occurs undetectable to both the source and the destination of the data access transaction, wherein intercepting occurs in a data path between a source of the data access transaction and a destination of the resulting data access transaction, and limiting occurs in a component separate from the source and destination, and the component separate from the source and destination is a separate network device than the components corresponding to the source and destination.

41. The method of claim 1 wherein padding the packet further comprises nondestructively modifying the packet such that the packet appears undisturbed to the receiver.

42. The method of claim 1 wherein modifying further comprises:

nondestructively modifying a payload of the packet at the application layer; and leaving encapsulated, non-payload control information in the packet undisturbed.

* * * * *